July 15, 1930.  I. ORNBERG  1,770,547
TIE BAR CONSTRUCTION FOR VEHICLES
Filed Aug. 13, 1928  2 Sheets-Sheet 1

Inventor
Ivan Ornberg

By Whittemore Hulbert
Whittemore & Belknap
Attorneys

July 15, 1930. I. ORNBERG 1,770,547
TIE BAR CONSTRUCTION FOR VEHICLES
Filed Aug. 13, 1928 2 Sheets-Sheet 2

Inventor
Ivan Ornberg
By Whittemore Hulbert
Whittemore & Belknap
Attorneys

Patented July 15, 1930

1,770,547

UNITED STATES PATENT OFFICE

IVAN ORNBERG, OF DETROIT, MICHIGAN, ASSIGNOR TO HUPP MOTOR CAR CORPORATION, OF DETROIT, MICHIGAN, A CORPORATION OF VIRGINIA

TIE-BAR CONSTRUCTION FOR VEHICLES

Application filed August 13, 1928. Serial No. 299,341.

This invention relates generally to vehicle bodies and more particularly to an improved means for supporting the fenders and headlamps thereof.

In vehicles as now commercially produced the fender and headlamp brackets are usually reinforced by suitable tie bars extending transversely of the vehicle in advance of the radiator. This construction is objectionable owing to the fact that it detracts from the general appearance of the vehicle.

It is therefore one of the primary objects of this invention to eliminate the foregoing objection by providing a construction wherein the fender and headlamp supporting brackets together with the tie bar therefor are concealed from view.

Another object of the present invention is to provide a bracket which in addition to supporting the headlamp functions to interconnect the tie bar with the fender bracket.

A further object of this invention is to provide a fender so constructed as to conceal the projecting ends of the tie bar and lamp brackets.

Figure 3:
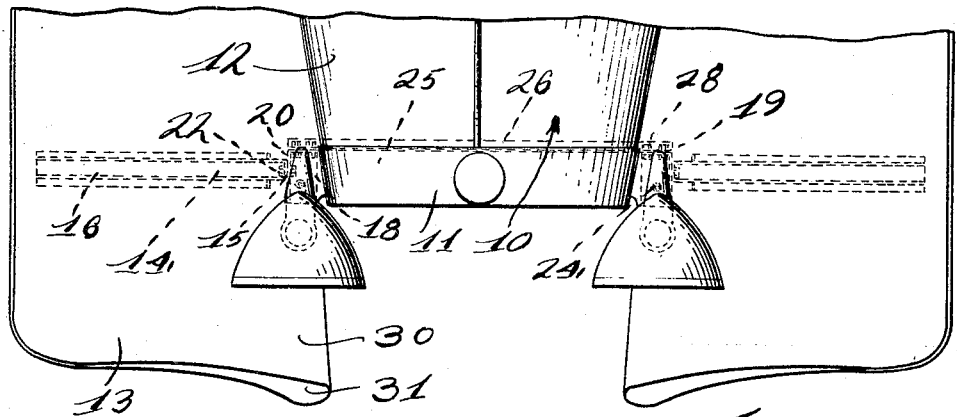
Figure 1:
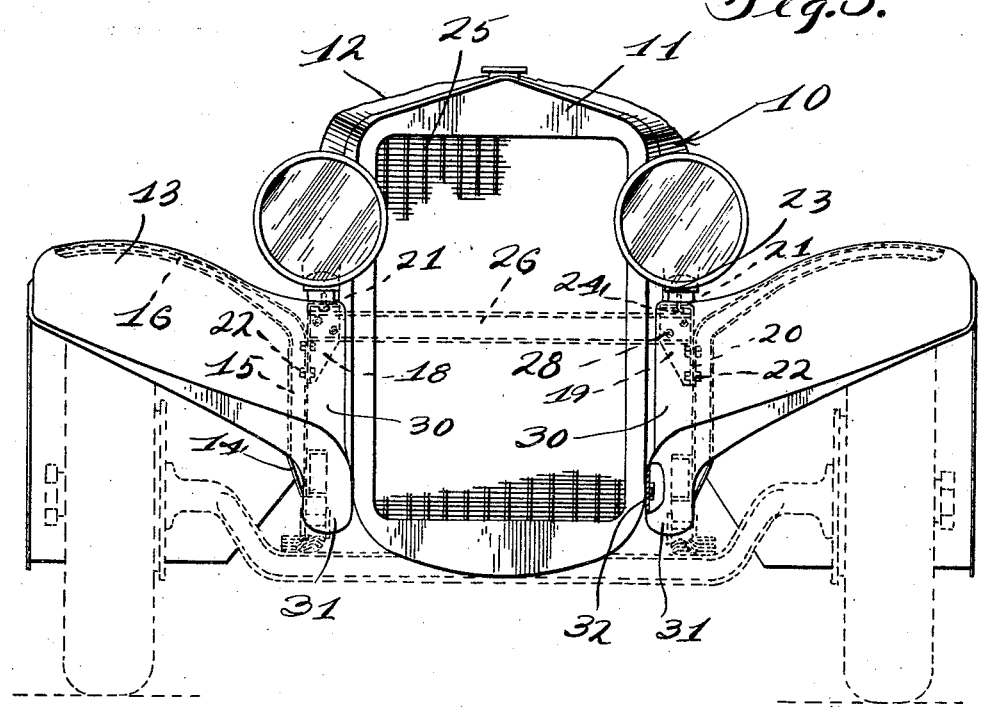
Figure 2:
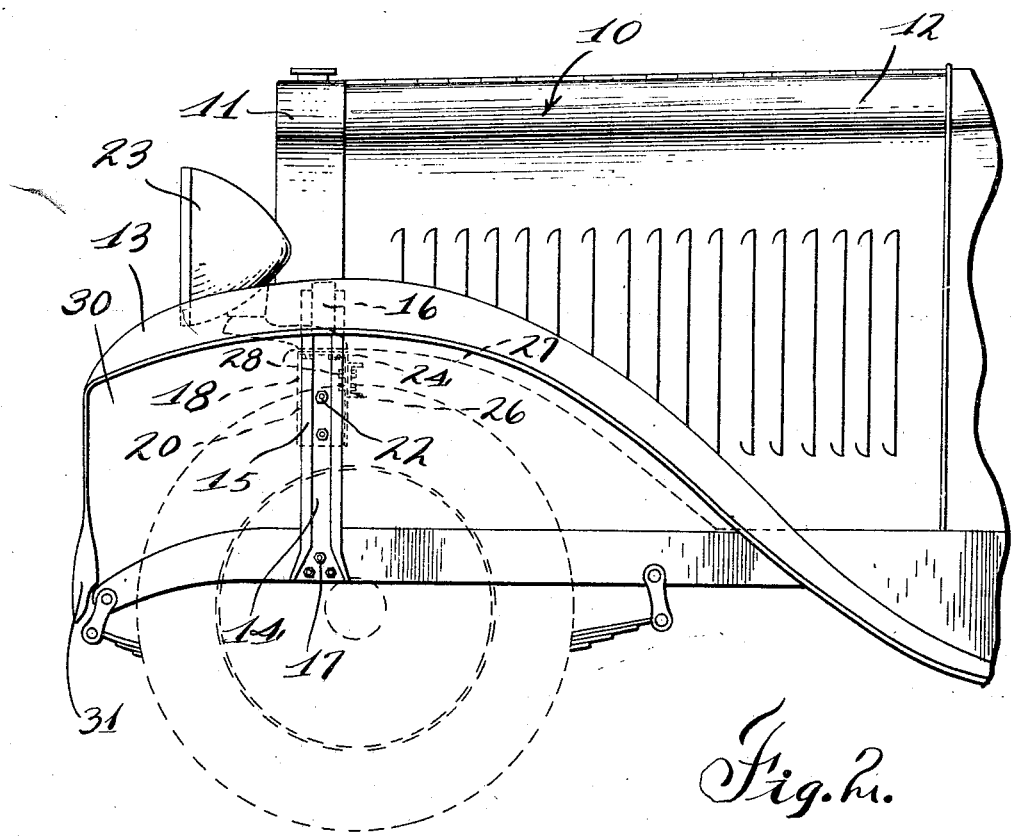
Figure 4:
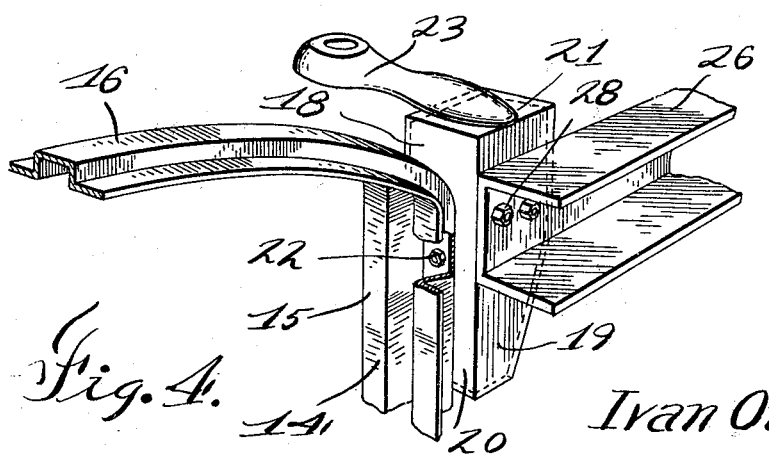

The invention contemplates other objects and novel details of construction all of which will be made more apparent as this description proceeds, especially when considered in connection with the accompanying drawings wherein, Figure 1 is a front elevational view of the vehicle having my invention applied thereto, Figure 2 is a fragmentary side elevation of the construction shown in Figure 1, Figure 3 is a plan view thereof, Figure 4 is a detail view showing a tie bar, fender bracket and interconnecting lamp brackets.

Referring now to the drawing, it will be noted that there is illustrated a vehicle 10 including a radiator shell 11, hood 12 and front fenders 13. The latter are preferably reinforced by suitable fender brackets 14 having upright portions 15 terminating in lateral arcuate portions 16, which constitute supports for the fenders. The upright portions 15 are secured at the lower ends thereof to the sill members of the frame as at 17 and at the upper ends to the lamp supporting brackets 18. The latter are preferably the shape illustrated in Figure 4 of the drawing having angularly arranged substantially vertical flanges 19 and 20 and further having horizontal flanges 21. The vertical flanges 20 constitute supports to which the fender brackets are secured by means of the bolts 22. The horizontal flanges on the other hand, constitute supports for the headlamps 23, which are rigidly secured to these flanges by means of the bolts 24.

As shown particularly in Figure 3 of the drawing, the vertical flanges 19 of the lamp brackets are disposed substantially in alignment with the rear side of the radiator core 25 so as to form a convenient means for securing the tie bar 26 to the lamp brackets. Referring more in detail to the above construction and with special reference to Figures 1 to 3 inclusive, it will be noted that the channel-shaped tie bar extends transversely of the vehicle in rear of the radiator core 25 and beneath the lower edges 27 of the hood. As shown the end portions of the tie bar are rigidly secured to the flange 19 by means of the bolts 28.

In order to provide an efficient construction and at the same time conceal the projecting ends of the tie bar together with the lamp supporting brackets, the fenders 29 are formed with lateral extensions 30 having depending flanges 31 adapted to be secured to the radiator shell by means of the bolts 32. As will be noted from Figure 1 of the drawings, the lateral extensions 30 of the fenders completely conceal the projecting ends of the tie bar and the lamp brackets.

The lower edges 27 of the hood preferably terminate substantially mid-way of the radiator shell and are shaped to follow the particular contour of the fender. With this arrangement, access to the engine compartment may be had by merely raising the hood in accordance with the usual practice.

Thus from the foregoing, it will be apparent that I have provided a novel front end construction for vehicles wherein the customary tie bar for the fenders is thoroughly concealed from view. Moreover with the present arrangement as heretofore pointed out, the lamp brackets in addition to supporting the lamps function to interconnect the ends of the tie bar with the fender brackets, the projecting ends of the tie bar and lamp brackets being completely concealed by the fenders.

What I claim as my invention is:

1. In a vehicle, the combination with a fender bracket and a lamp, of a tie bar, a supporting bracket for said lamp interposed between said tie bar and fender bracket, said lamp bracket having a portion secured to one end of said tie bar and having another portion secured to the fender bracket, and a fender supported by said fender bracket and adapted to conceal the end aforesaid of the tie bar and said lamp bracket.

2. In a vehicle, the combination with a fender bracket and a lamp, of a tie bar, means disposed between the tie bar and fender bracket for interconnecting the latter with the former, said means including a supporting bracket for said lamp, and a fender having a portion adapted to conceal said lamp bracket.

3. In a vehicle, the combination with a radiator and fenders upon opposite sides thereof, of brackets for said fenders, a tie bar extending in rear of said radiator between said brackets, and head lamp supporting brackets interposed between the ends of said tie bar and fender brackets for establishing a connection therebetween, said tie bar, fender and lamp brackets being thoroughly concealed by the radiator and fenders.

4. In a vehicle, the combination with a pair of spaced supporting brackets, of a tie bar extending between said brackets for bracing the latter, means disposed between the end of the tie bar and brackets for interconnecting the former with the latter, and fenders carried by the supporting brackets aforesaid having portions concealing the said brackets and the interconnecting means.

5. In a vehicle, the combination with a pair of brackets spaced upon opposite sides of the vehicle, of a tie bar extending transversely of the vehicle in rear of the radiator, lamp supporting brackets disposed between the ends of the tie bar and brackets aforesaid for interconnecting the former with the latter, and fenders carried by the first-mentioned brackets having portions concealing the latter brackets and also the lamp supporting brackets.

6. In a vehicle, the combination with a pair of fender supporting brackets spaced upon opposite sides of the vehicle, of a tie bar extending transversely of the vehicle in rear of the radiator so as to be concealed from view, and means disposed between the opposite ends of the tie bar and fender supporting brackets for interconnecting the former with the latter.

In testimony whereof I affix my signature.

IVAN ORNBERG.